US008775939B2

(12) United States Patent
Van Melle et al.

(10) Patent No.: US 8,775,939 B2
(45) Date of Patent: Jul. 8, 2014

(54) SYSTEMS AND METHODS FOR AUDIENCE-ENABLED ACCESS TO PRESENTATION CONTENT

(75) Inventors: William Van Melle, Los Altos, CA (US); Gene Golovchinsky, Menlo Park, CA (US); Scott Carter, Los Altos, CA (US); Pernilla Quarfordt, Los Altos, CA (US); Anthony Dunnigan, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1031 days.

(21) Appl. No.: 12/390,392

(22) Filed: Feb. 20, 2009

(65) Prior Publication Data

US 2010/0218099 A1 Aug. 26, 2010

(51) Int. Cl.
*G06F 3/00* (2006.01)
(52) U.S. Cl.
USPC ............................................. 715/730
(58) Field of Classification Search
CPC ........... G06F 3/048; G09B 7/00; G06Q 10/10
USPC ............................................. 715/730
See application file for complete search history.

(56) References Cited

U.S. PATENT DOCUMENTS

| | | | | |
|---|---|---|---|---|
| 2002/0158852 | A1* | 10/2002 | Mori et al. ..................... | 345/173 |
| 2009/0317784 | A1* | 12/2009 | Syou et al. ..................... | 434/309 |
| 2010/0037151 | A1* | 2/2010 | Ackerman et al. ............ | 715/753 |
| 2010/0122171 | A1* | 5/2010 | Bauchot et al. ............... | 715/732 |
| 2011/0063191 | A1* | 3/2011 | Leung et al. .................. | 345/1.1 |

OTHER PUBLICATIONS

Barker, P., Computer Control of a Random Access Slide Projector. Microprocessing and Microprogramming, V. 10, pp. 261-271, 1982. URL:http//eric.ed.gov/ERICWEBPortal/custom/portets/record-details/detailmini.jsp?accno=ED242287.
Turning Technologies, "Audience Response System," downloaded Oct. 27, 2009, 1 pg., http://www.turningtechnologies.com/AudienceResponseSystems.
Turning Technologies, "Audience Response Products", downloaded Oct. 27, 2009, 1 pg., http://www.turningtechnologies.com/audienceresponseproducts.
Turning Technologies, "Polling Software," downloaded Oct. 27, 2009, 1 pg., http://www.turningtechnologies.com/audienceresponseproducts/pollingsoftware.
Turning Technologies, "Turning Point," downloaded Oct. 27, 2009, 1 pg., http://www.turningtechnologies.com/audienceresponseproducts/pollingsoftware/turningpoint.
Turning Technologies, "TurningPoint Any Where PC," downloaded Oct. 27, 2009, 1 pg., http://www.turningtechnologies.com/audienceresponseproducts/pollingsoftware/turningpointanywhere.
Turning Technologies, "RemotePoll," downloaded Oct. 27, 2009, 1 pgs., http://www.turningtechnologies.com/audienceresponseproducts/pollingsoftware/remotepoll.

(Continued)

*Primary Examiner* — Boris Pesin
*Assistant Examiner* — Angie Badawi
(74) *Attorney, Agent, or Firm* — Morgan, Lewis & Bockius LLP (57) ABSTRACT

A system and method for accessing content provided by a presenter during a presentation is described. The system and method includes a presentation module used by a presenter to display presentation materials to audience members during a presentation. Also included is a selection module that allows a display of a representation of the presentation materials that have been displayed. When activated, the selection module enables an audience member to select for redisplay by the presentation module a particular one of the presentation materials.

25 Claims, 11 Drawing Sheets

(56) References Cited

OTHER PUBLICATIONS

PowerComars, downloaded Oct. 27, 2009, 1 pg., http://www.powercomars.com/audienceresponsesystems/.

PowerComars, "PowerCom for Reply Worldwide," downloaded Oct. 27, 2009, 3 pgs., http://www.powercomars.com/powercom/powercom-for-reply-worldwide.html.

PowerComars, "PowerCom for Reply Plus," downloaded Oct. 27, 2009, 2 pgs., http://www.powercomars.com/powercom/powercom-for-reply-plus.html.

PowerComars, "PowerCom Moment to Moment," downloaded Oct. 27, 2009, 2 pgs., http://www.powercomars.com/powercom/powercom-moment-to-moment.html.

Option Technologies, "Audience Response Systems by Option Technologies Interactive," downloaded Oct. 27, 2009, 1 pg., http://www.optiontechnologies.com/.

Option Technologies, "Audience Response Equipment & Products," downloaded Oct. 27, 2009, 1 pg., http://www.optiontechnologies.com/audience-response-systems/.

Option Technologies, "Audience Response Software-OptionPower," downloaded Oct. 27, 2009, 1 pg., http://www.optiontechnologies.com/audience/response/optionpower.asp.

Option Technologies, "Audience Response Systems Key Features of OptionPower," downloaded Oct. 27, 2009, 1 pg., http://www.optiontechnologies.com/products/optionpower_feature.asp.

* cited by examiner

SYSTEMS AND METHODS FOR AUDIENCE-ENABLED ACCESS TO PRESENTATION CONTENT

TECHNICAL FIELD

The present invention relates to audience response systems, and more specifically to allowing audience access to content from among presented materials for redisplay during a presentation or meeting.

BACKGROUND

Question and answer (Q&A) sessions following presentations often require presenters to re-display particular slides so that audience members can ask questions about them. It is sometimes time-consuming and frustrating for audience members to communicate with presenters to re-display a desired slide. Language issues, ambiguous references, and slide advance latencies all contribute to errors in identifying the desired slide. For example, an audience member typically relies on their recollection of a slide that was already presented to propose a question to the presenter at various points during a presentation or meeting. In other situations, when an audience member asks a question during a presentation of slides, the presenter must navigate through already presented slides to select and redisplay the slide at issue. This typically involves the presenter having to revert back through presented slides one-by-one, looking for the correct slide. At the end of the question and answer session, the presenter must again navigate through the slides one-by-one to return to the current slide and resume the presentation. It can be a time-consuming, awkward and frustrating experience for both the presenter and audience members if questions are raised during the presentation.

Therefore, there is a need for a system and method that allows an audience member to select presented materials for redisplay so that they can ask a question or make a point about the materials with minimal disruption to the presentation and without wasting the time of the presenter and other audience members.

SUMMARY

According to some embodiments, a system is provided for accessing content provided by a presenter during a presentation. The system includes one or more processors, memory, and software modules stored in the memory and executable by the one or more processors. Included in the software modules is a presentation module for use by the presenter to display presentation materials to audience members. Also included is a selection module configured to display for one or more of the audience members a representation of the presentation materials that have been displayed. The selection module enables an audience member to select for redisplay by the presentation module a particular one of the presentation materials.

According to some embodiments, a method for accessing content provided by a presenter during a presentation is described. Presentation materials and a representation of the presentation materials are displayed to audience members. The method includes enabling an audience member to select from the representation a particular one of the presentation materials already presented, in response to which the selected particular one of the presentation materials already presented is displayed.

According to other embodiments, a computer readable storage medium has one or more programs for execution by one or more processors. The one or more programs comprise instructions for displaying presentation material and a representation of the presentation materials already presented to audience members. Also included are instructions for enabling an audience member to select from the representation a particular one of the presentation materials already presented. The instructions also allow for the particular one of the presentation materials already presented to be displayed in response to the selection.

DESCRIPTION OF EMBODIMENTS

Certain details are set forth below to provide a sufficient understanding of embodiments of the invention. However, it will be clear to one skilled in the art that various embodiments may be practiced without these particular details. Moreover, the particular embodiments of the present invention described herein are provided by way of example and should not be used to limit the scope of the invention to these particular embodiments. In other instances, well-known system features, devices and software operations have not been shown in detail in order to avoid unnecessarily obscuring the invention. The subject is now described in more detail.

Figure 1A:
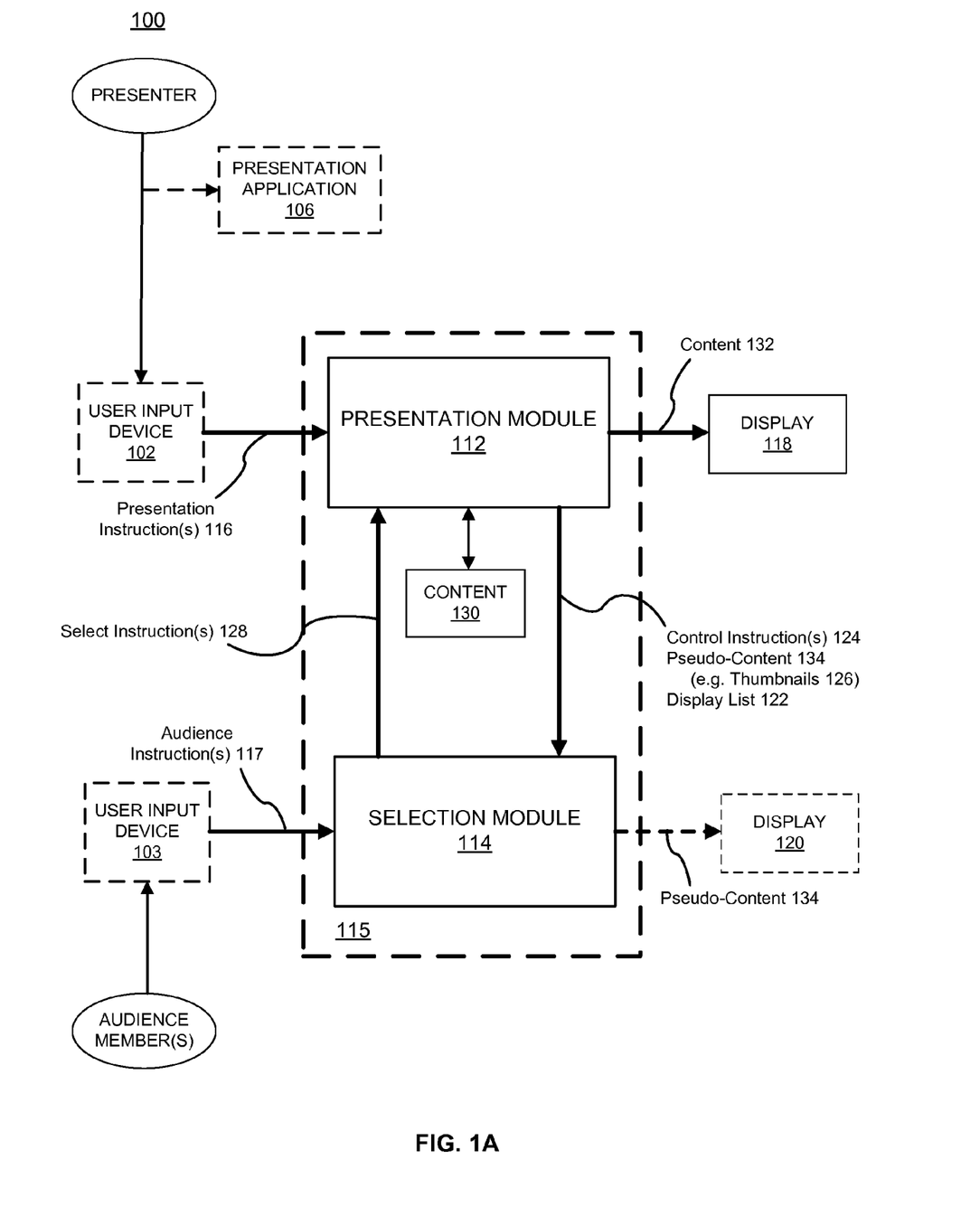
FIG. 1A is a block diagram of software modules in a presentation management system according to an embodiment.

FIG. 1A is a block diagram of software modules in a presentation management system 100 according to some embodiments. The software modules include a presentation module 112 and a selection module 114 that may be executed on the same device 115 (as shown in FIG. 1A) or on separate, interconnected devices. The presentation module 112 controls the presentation of content 132 (derived from stored content 130) on one or more displays 118 in response to presentation instructions 116 issued by a presenter via an input device 102 or, alternatively, via a presentation application 106. The presentation module 112 also controls operation of the selection module 114 using control instructions 124 and information about the presentation, including display lists 122 and pseudo-content 134, which in some embodiments are generated by the presentation module 112 from the displayed content 132. Examples of pseudo-content for a conventional slide presentation include, but are not limited to, thumbnail images and slide titles of respective slides in the presentation.

The selection module 114, subject to the control instructions 124, enables audience members to select for redisplay particular items of the displayed content 132. In some embodiments, audience members select content items for redisplay using a user input device 103 that issues corresponding audience instructions 117 to the selection module 114. In the illustrated embodiment, audience members select items of content 132 to be redisplayed by selecting corresponding items from a set of displayed pseudo-content 134 (such as thumbnail images 126) derived from the displayed content 132.

The pseudo-content 134 can be displayed to audience members on the display 118 or on one or more secondary displays 120. Each item of pseudo-content 134 is associated with an entry in the display list 122, which indicates the presentation position of the corresponding item of content 132. In response to selection by an audience member of a particular pseudo-content item 134, the selection module 114 issues to the presentation module 112 a selection instruction 128 that conveys the display list position of the item of displayed content 132 that corresponds to the selected one of the pseudo-content 134. In this way, the presentation module 112 is able to redisplay the correct item of displayed content identified by the audience member. In some embodiments, as described further with reference to FIG. 6, the display 118 includes one or more large screens that can be viewed by an audience in the same room as the presenter. The display 118 can also include one or more display screens of respective networked devices from which one or more audience members can view the presentation and/or the redisplayed, audience-selected items of content 132, either locally or remotely from the location where the presentation is being given.

In some embodiments, the displayed content 132 is derived from stored content 130 that is accessible to the presentation module 112. The displayed content 132 can be identical to the stored content 130, but it might also be a subset of the stored content 130 (such as when the presenter omits from a presentation particular content items) and/or a different arrangement of the stored content (such as when the presenter changes the presentation order of the content). The presentation content 130, 132 may be a variety of types, including, but not limited to, slides, icons, image files, documents, and digital media, and may be locally stored in local memory or stored externally to the system 100.

As already mentioned, in some embodiments a presenter controls the presentation of displayed content 132 using the user input device 102, and optionally content from the presentation application 106, to issue corresponding presentation instructions 116 to the presentation module 112. In a similar way, a presenter can also control and/or perform standard navigation operations within the presentation content 130 and/or the displayed content 132. Exemplary navigation operations include skipping forward or backward within the displayed content 132 or stored content 130; moving to the next or previous item of content item 130, 132; or temporarily pausing display of the content 132 when the presentation is automated. A presenter can also employ the user input device 102 or presentation application 106 to convey instructions to the presentation module 112 to enable or disable certain operations of the selection module 114. For example, a presenter via the user input device 102 can instruct the presentation module 112 that it is to enable the selection module 114 to receive audience instructions 117 to select and redisplay already-presented content 132. The presenter would typically do this at a time or times of their choosing (such as at the end of the presentation or at a section break).

As an alternative to manual control by a presenter via presentation instructions 116, the presentation module 112 may be configured to automatically activate the selection module 114 at certain points or times during the presentation. In such embodiments, the system 100 may run autonomously during the presentation, without being manually controlled by the presenter, and the presentation module 112 activates the selection module 114 to receive audience input after certain time intervals or in response to certain indicators in the presentation content 130, 132. For example, in some embodiments the presentation module 112 is configured to enable the selection module 114 to receive audience inputs in response to the occurrence of designated language elements in the content 130, 132. For example, designated language elements may include, but are not limited to, "any questions," "questions," "end," "Q&A," and "discussion."

In some embodiments, the presentation module 112 tracks the presentation content 132 as it is displayed and updates the selection module 114 in real-time (as the presentation content 130 is displayed) with information that it generates about the presentation, including display lists 122 and pseudo-content 134. The pseudo-content 134, which is a representation of the displayed content 132, is transmitted to the selection module 114 for display to audience members during the presentation. The pseudo-content 134 is separately displayed (for example, on one of the displays 118, 120) to indicate which of the content items 130 have been displayed. The pseudo-content 134 may be displayed in any number of forms. For example, in some embodiments where the content 130, 132 is provided as presentation slides, the presentation module 112 generates the pseudo-content 134 in the form of thumbnails of the respective slides. As described above, the presentation module 112 also generates an accompanying display list 122 that indicates the presentation order of the slides 130 as they are displayed as displayed content 132.

The display of the pseudo-content 134 may be controlled by the presentation module 112 in some embodiments, and by the selection module 114 in other embodiments. The pseudo-content 134 may be displayed on the same display device 118 as the content 132 or on a second display 120. The presentation module 112 may display the pseudo-content 134 on the display 118 as the pseudo-content 134 is generated. Alternatively, the selection module 114 may be configured to display the pseudo-content 134 on the second display device 120 as it receives updates from the presentation module 112. The selection module 114 can update the displayed pseudo-content 134 as each item of the presentation content 130, 132 is displayed to audience members, or just after the content 130, 132 has been displayed.

Once the selection module 114 is activated, a user input device 103 is enabled and an audience member can select from the displayed pseudo-content 134. The audience member uses the user input device 103 to transmit an input instruction 117 indicative of the selection. Once the audience member selects an item from the displayed pseudo-content 134, the selection module 114 transmits a select instruction 128 to the presentation module 112 indicative of the audience selection. In response, the presentation module 112 redisplays the selected content item 130, 132 on the display device(s) 118.

The input devices 102, 103 can be any desktop computer, laptop, or any other device (such as a remote control device, handheld computer, PDA or smart phone) that is configured to issue the instructions 116 or 117 to the presentation module 112 or selection module 114, respectively. In some embodiments, the input devices 102, 103 can be separate from the one more computers on which the presentation module 112 and/or the selection module 114 are executed, or either one can be a component of one of those one or more computers.

The selection module 114 may be part of an underlying presentation package that includes the presentation module 112. Presentation packages may include, but are not limited to, Powerpoint, Keynote, Impress, Google Presentations and other known presentation applications. The selection module 114 may, alternatively, be executed separately from the presentation module 112, and may include features independent of the underlying presentation package. For example, the selection module 114 may be accessed by a client application, such as a web browser on a client computer. The web browser may also be implemented and viewed on a portable personal device. Thus, the selection module 114 may be executed as a separate package entirely or from a remote location (e.g., as a web service) accessible from a laptop or PDA. Various components of the selection module 114 and presentation module 112 may be from one or more devices, embodiments of which are described in further detail in other sections.

Figure 1B:
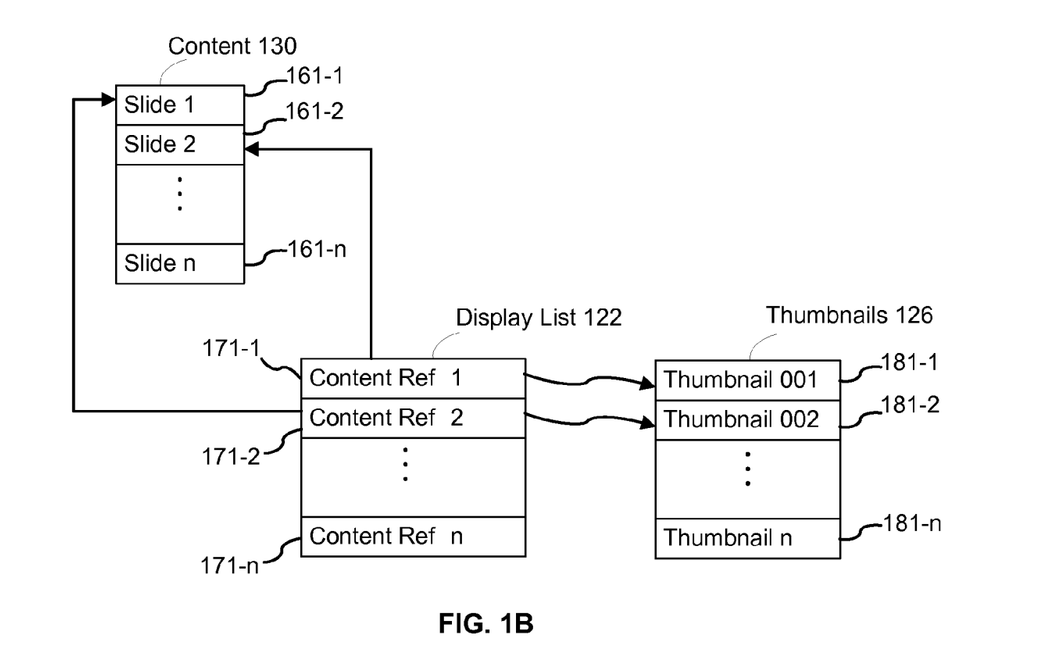
FIG. 1B is a diagram of data structures of the display list 122 and pseudo-content 134 according to some embodiments.

Additional details of the display list 122, content 130 and pseudo-content 134 of FIG. 1A are now described with reference to FIG. 1B, which illustrates data structures of those items according to some embodiments. The display list 122 includes a list of identifiers 171-1 to 171-n of stored content items 161-1 to 161-n organized according to the presentation order of those items within the displayed content 132. In some embodiments, the identifiers 171 of the stored content 130 are addresses or names of items of the stored content 130, or other such links that can be used by the presentation module 112 to access particular items of stored content 130 for redisplay. Each of the pseudo-content items 181-1 to 181-n is a representation of a corresponding displayed content item 132. The pseudo-content items 181-1 to 181-n do not need to be stored in any particular order; however each pseudo-content item 181-1 to 181-n is associated with the identifier 171-1 to 171-n of the corresponding stored content item 161-1 to 161-n from which it was derived. Thus, in response to user selection of item of pseudo-content 134, the selection module 114 is able to provide the appropriate index 171 of the corresponding item of stored content 161 to permit the presentation module 112 to redisplay that content.

Figure 1C:
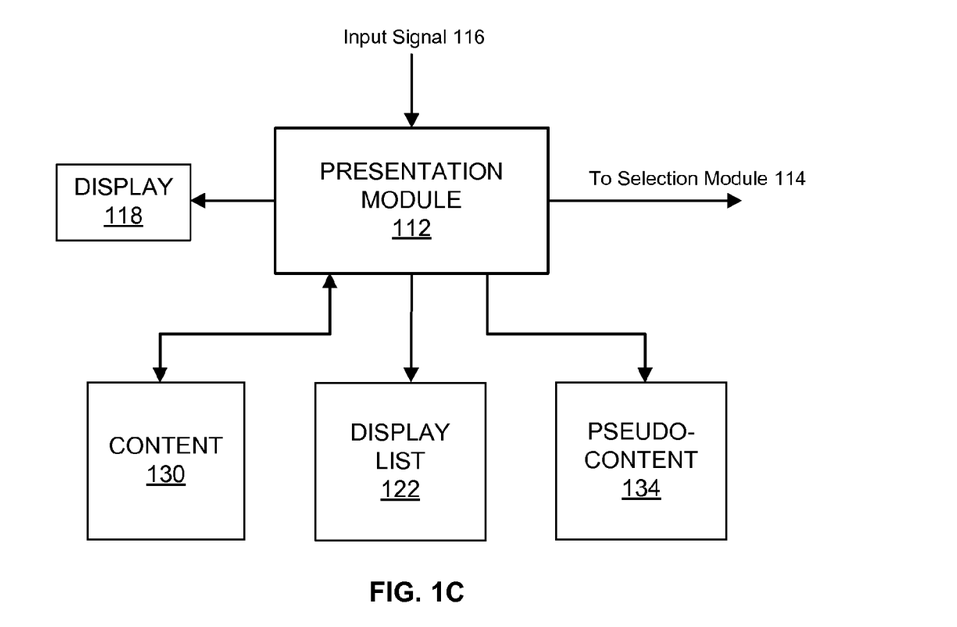
FIG. 1C is a block diagram of the presentation module 112 of FIG. 1A in more detail according to some embodiments.

FIG. 1C illustrates a configuration of the presentation module 112, according to some embodiments. In some embodiments, such as shown in FIG. 1A, the presentation module 112 coordinates the display and execution of the presentation content 130 and associated tasks for the presentation management system 100. The presentation module 112 displays the content on the display device 118 in response to the input instruction 116 and generates the display list 122 and the pseudo-content 134 of the presented content 132, which enables the operation of the selection module 114. The presentation module 112 also updates the display list 122 and the pseudo-content 134 and notifies the selection module 114 of the updates to the presentation content 132. Thus, the presentation module 112 provides a current record of the displayed content 132, which can be achieved in real-time, such that audience members may select a content item for redisplay from an accurate representation of the presented content 132, the order of which may not correspond to the actual order of the presentation content 130.

Figure 2:
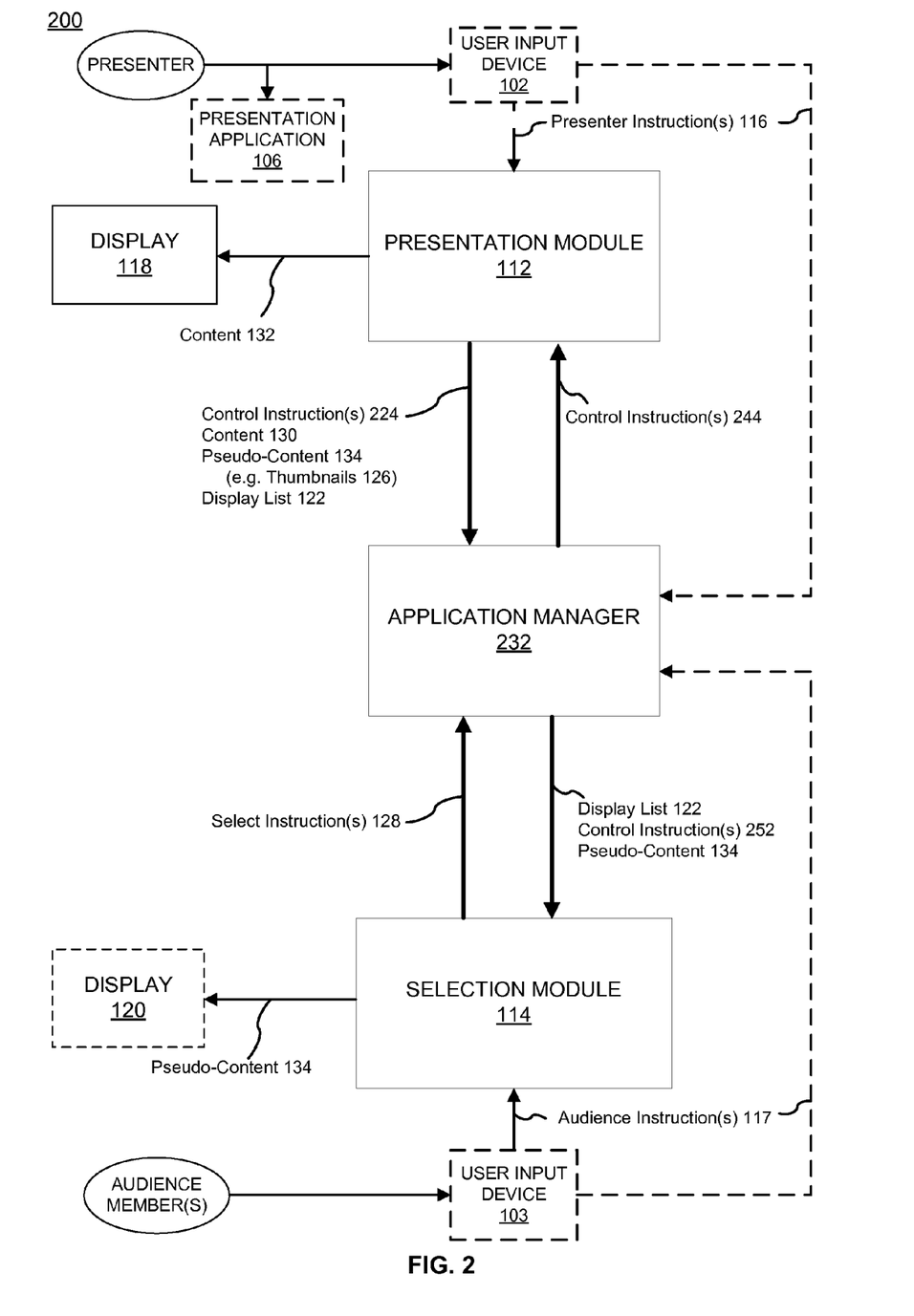
FIG. 2 is a block diagram of software modules of a presentation management system according to some embodiments.

FIG. 2 is a block diagram of a presentation management system 200 having software modules according to other embodiments. FIG. 2 includes several components shown in FIG. 1A that share the same reference numbers as FIG. 1A. In the interest of brevity, these same features will not be described again. The software modules in FIG. 2 include the presentation module 112, the selection module 114 and an application manager 232 that coordinates different components of the other modules in the system 200. As in FIG. 1, each of the modules 112, 114, 232 may be executed by separate devices or by a single device. The application manager 232 is configured to interface between the presentation module 112 and the selection module 114 (and other modules not shown). The application manager 232 sends and receives control or data instructions to coordinate between the modules. For example, the application manager 232 may be configured to receive instructions 124, 128 from the presentation module 112 and the selection module 114 and correspondingly provide instructions to each module responsive to the received instructions 124, 128.

In some embodiments, the presentation module 112 sends the control instruction 224 (and the content 132) instructing the application manager 232 to display the content 132 as it is being presented to audience members. In response, the application manager 232 is also configured to send instructions 252 to update and notify the selection module 114 as new content is being presented (e.g., update the list 122, the thumbnails 126, etc.), such that the selection module 114 tracks a current list of presented content 132. The presentation order of the display list 122 and the thumbnails 126, thus, correspond to the order in which the content 132 is presented by the presenter to audience members.

In some embodiments, the presentation module 112 sends a control instruction 224, to the application manager 232 to activate the selection module 114 and enable audience access to content 132 for selection and redisplay. The application manager 232, in response to the control instruction 224, sends a corresponding control instruction 252 to activate the selection module 114. It will be appreciated that control instructions 224, 252 include similar details as the control instruction 124 of FIGS. 1A and 1C except that the instructions 224, 252 are coordinated by the application manager 232. When the selection module 114 is enabled, an audience member may select content from the displayed pseudo-content 134 (e.g., thumbnails 126, or list of slide titles (not shown)) using the input device 103. When an audience member selects an item from the pseudo-content 134 (by transmitting the input instruction 117 from the user device 103) the selection module 114 transmits the select instruction 128 to the application manager 232. In response, the application manager 232 notifies the presentation module 112 of the selection indicated by the control instruction 244. The presentation module 112 then displays the selected content item on the device 118.

In optional embodiments, the user input devices 102, 103 may be configured to communicate directly with the application manager 232 instead of respective modules 112, 114. In such embodiments, the instructions 116, 117 from the presenter or the audience member is received by the application manager 232, and in response, the application manager 232 executes instructions 244, 252 to each module 112, 114 accordingly. Therefore, in such embodiments, the application manager 232 mediates all communications between the various modules and devices of the system 200, and orchestrates the entire presentation experience.

Figure 3:
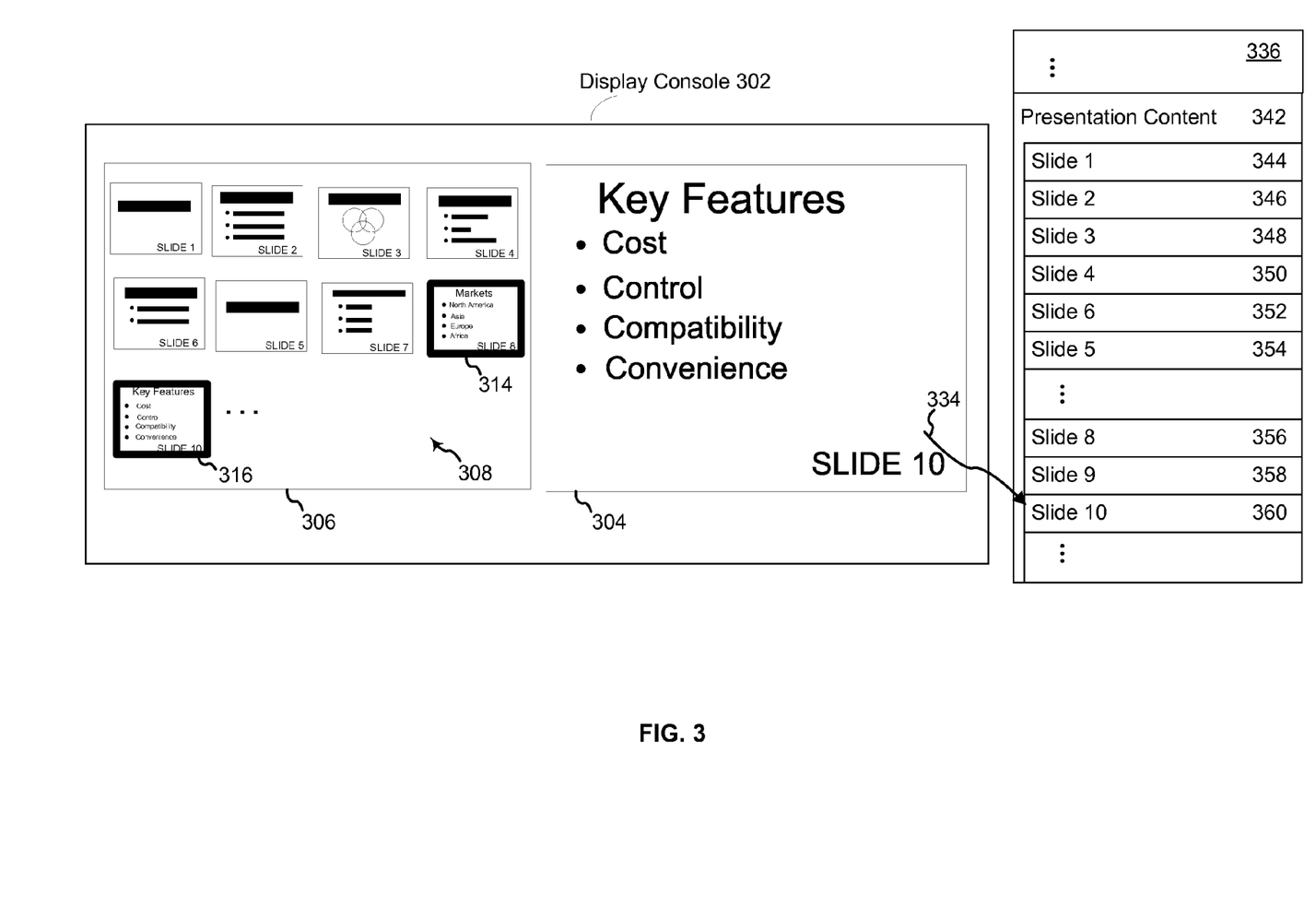
FIG. 3 is a diagram illustrating the organization of presentation materials on a display according to some embodiments.

FIG. 3 is a diagram illustrating the organization of presentation materials on a display console 302 according to embodiments. The display console 302 includes two display windows 304, 306. The display window 304 displays content currently being displayed by the presenter, such as presentation SLIDE 10. The presentation content 130, 132 may be stored in a memory 336 that may be stored on a separate storage device such as a memory card, computer laptop or a server. For example, the currently displayed Slide 10 corresponds to the Slide 10 stored in memory 336 as indicated by arrow 334.

The display window 306 displays representations of the content displayed in window 304 during the presentation from which a viewer may select a slide for redisplay. For example, the display window 306 displays a group of thumbnail image slides 308 representing all the slides that have been presented, and includes a thumbnail slide 316 of the Currently displayed SLIDE 10. The display window represents the slides 308 that enable selection by an audience member. In some embodiments, the order in which the presentation materials are presented may be customized by the presenter in the presentation module 112. Therefore, the order in which the presentation materials are displayed, as represented by thumbnails 308 may be different than the order in which the presentation materials are stored in memory 336. For example, the thumbnails 308 show that the thumbnail 316 for SLIDE 10 follows a thumbnail 314 for SLIDE 8 which was presented after SLIDE 8. Thus, the thumbnails 308 are uploaded to the selection module 114 according to the order in which the slides are presented, which may not necessarily be the order in which they are stored in memory 336. The thumbnails 308 may also be uploaded during or just after presentation of the respective slide.

Figure 4:
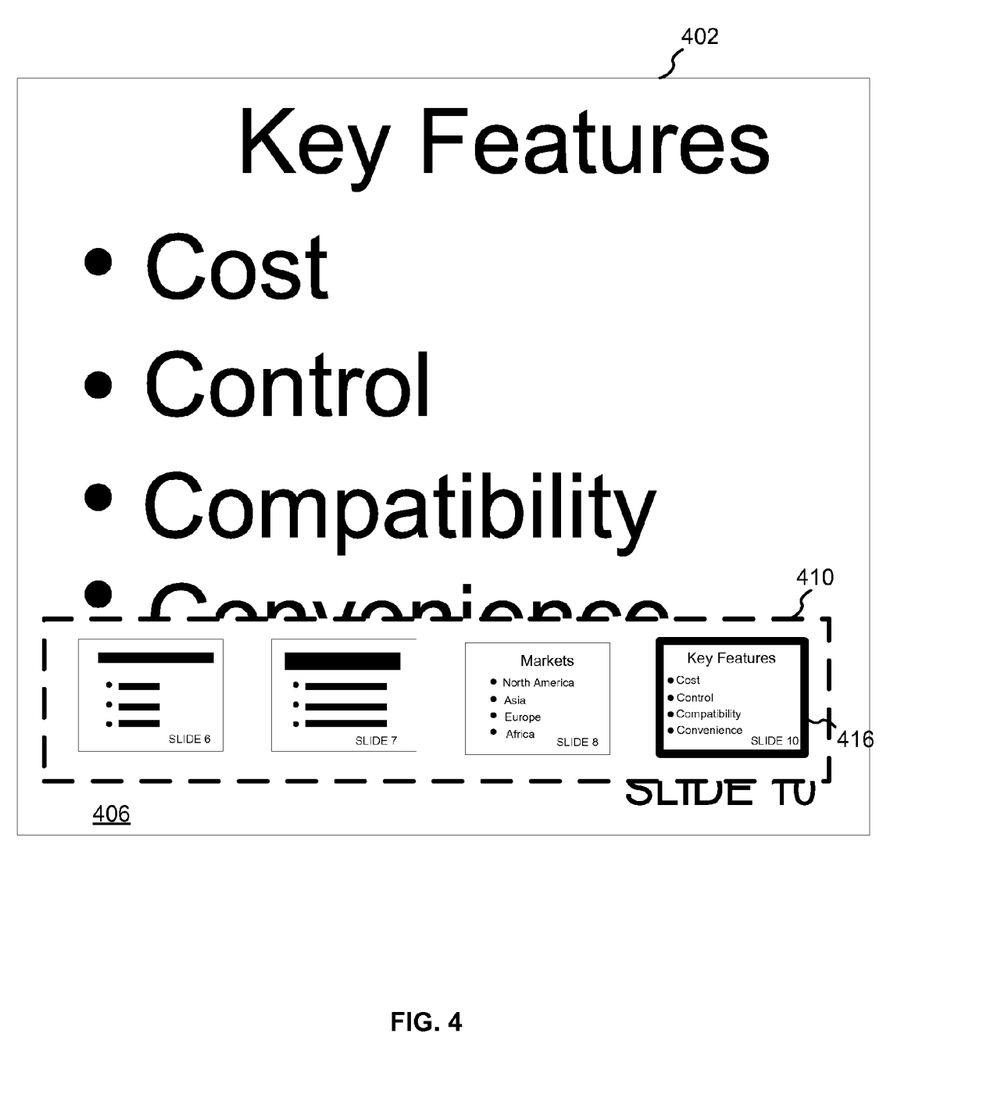
FIG. 4 is a diagram illustrating the organization of presentation materials on a display according to another embodiment.

FIG. 4 is a diagram illustrating the organization of presentation materials on a display 402 according to another embodiment. In some embodiments, the display 402 shows the presentation materials, such as a presentation slide 406. However, when the selection module 114 is activated, a representation of the already presented materials, such as thumbnails 410 is shown as an overlay on the same display 402. In some embodiments, an audience member can navigate through all the thumbnails 410 and select one to be redisplayed. As in FIG. 3, the thumbnails 410 are displayed in the order in which the slides are presented, with the last thumbnail 416 corresponding to the currently displayed slide 406 above.

Figure 5:
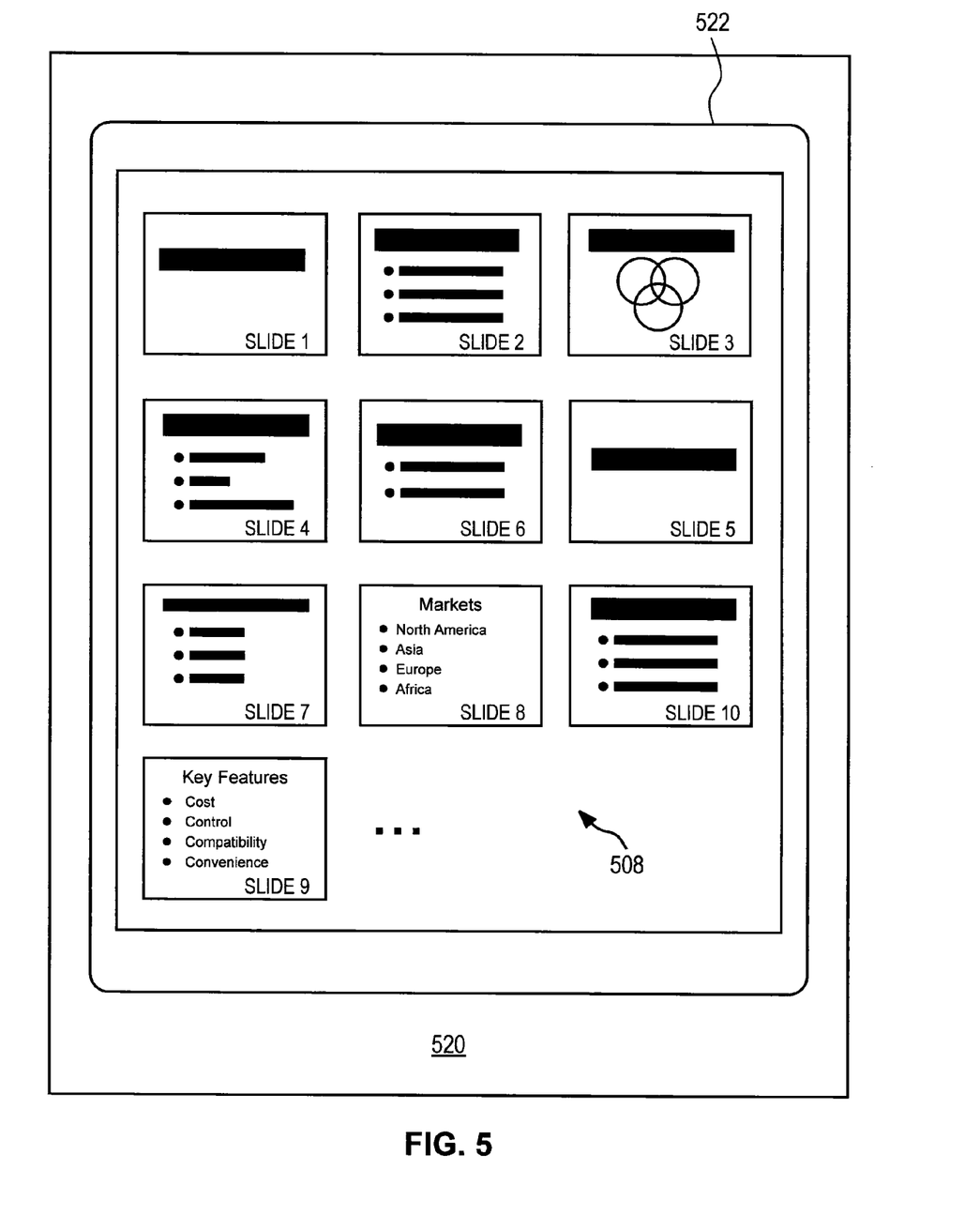
FIG. 5 is a diagram illustrating the organization of presentation materials on a display of a portable handheld device according to some embodiments.

FIG. 5 is a diagram illustrating the organization of presentation materials on a display 522 of a portable handheld device 520 according to another embodiment. The presentation module 112, according to embodiments, may be configured to provide the pseudo-content 134 of presented materials to personal handheld devices, such as the device 520. Thus, audience members may be remote from the presenter. In some embodiments, the selection module 114 is operated by a networked computer and the pseudo-content 134 (such as thumbnail slides 508) may be displayed through a browser on a webpage.

In some embodiments, the pseudo-content 134 may be displayed on the portable device screen 522. As previously described, the pseudo-content 134 may be displayed as thumbnail slides 508, or any other form of content that may be displayed on the portable device screen 522. The portable device may be connected remotely, such as a by a network connection. In some embodiments, when the selection module 112 is activated, audience members are enabled to select content from the displayed thumbnails 508. As in other embodiments, the thumbnail slides 508 are displayed in the order in which they are presented.

Figure 6A:
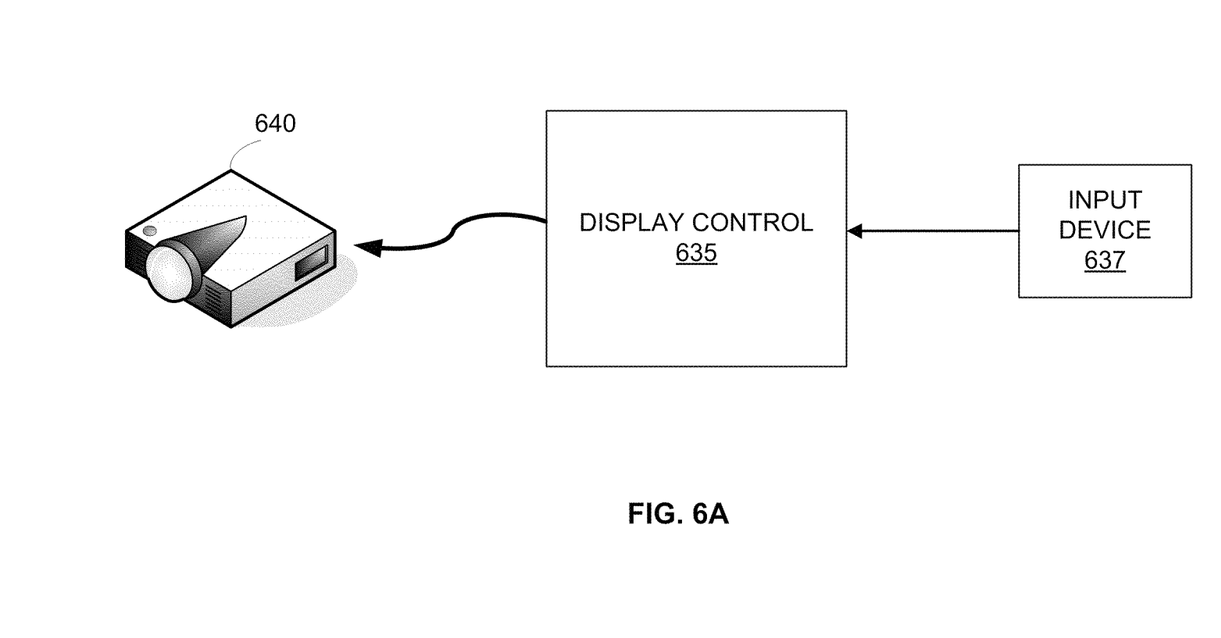
FIGS. 6A to 6C are diagrams illustrating components of a presentation management system and their connections in accordance with some embodiments.
Figure 6B:
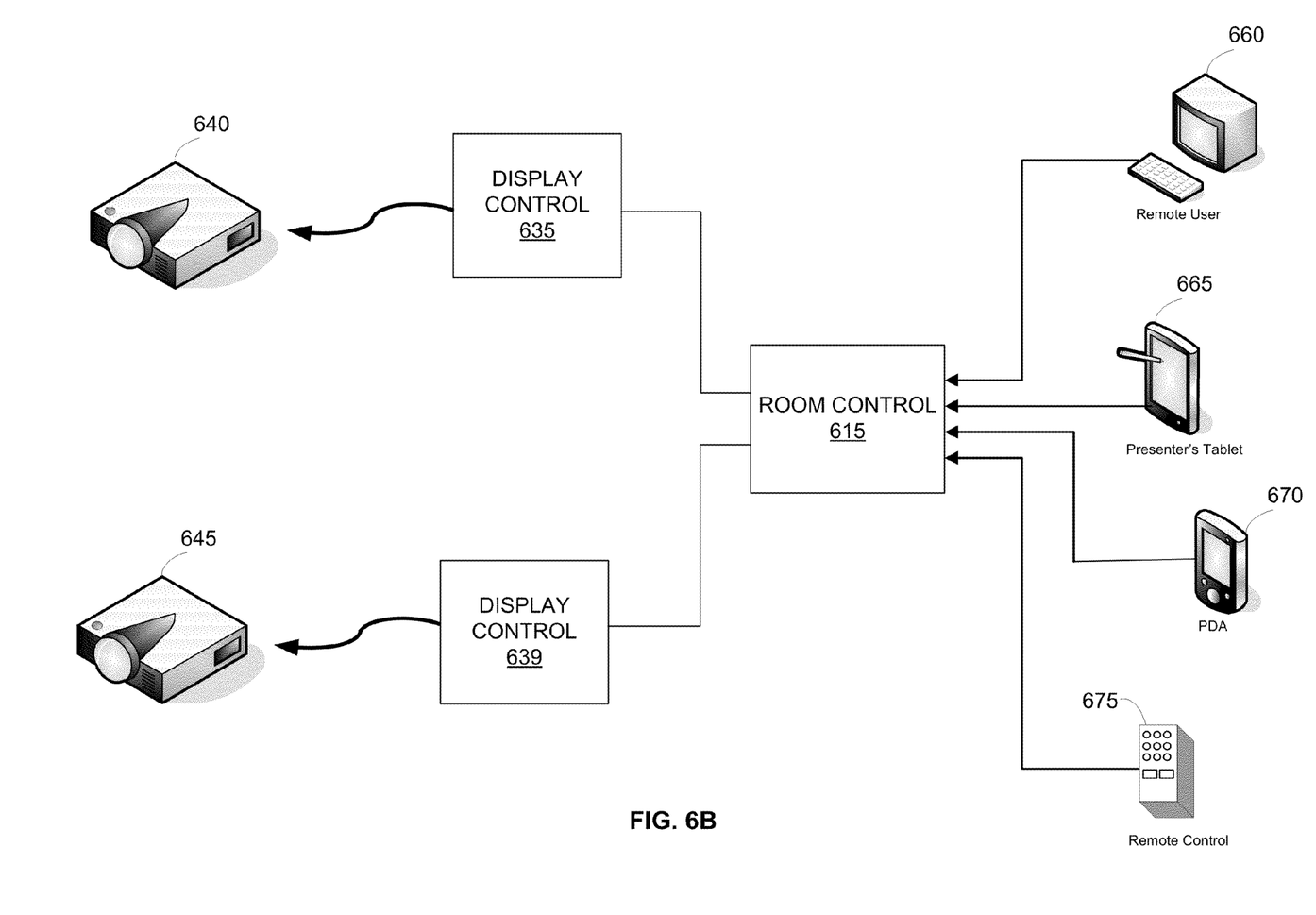
Figure 6C:
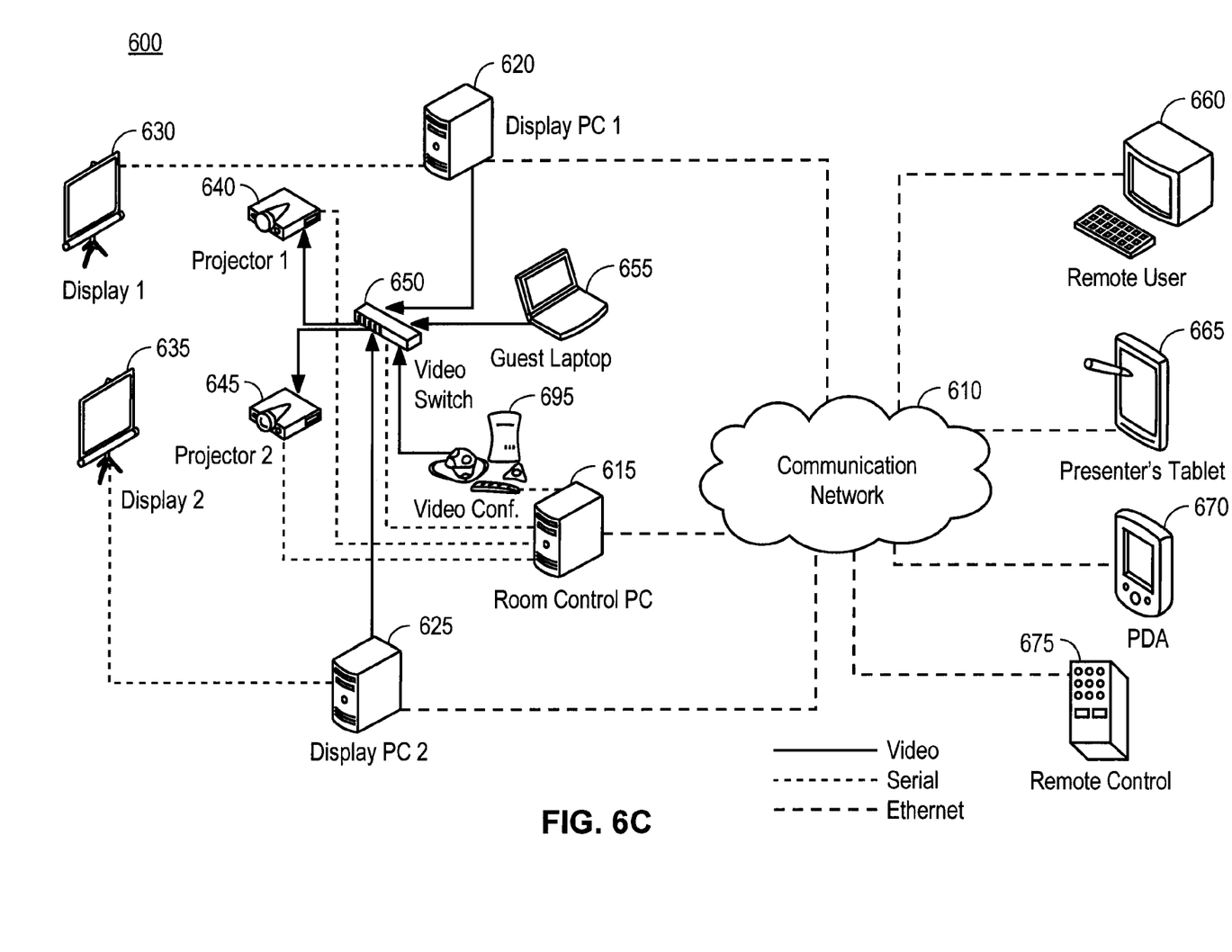

FIGS. 6A-6C illustrate components of various presentation management systems and their connections according to some embodiments. In some embodiments, such as in FIG. 6A, input device 637 instructs a display control component 635 to display presentation content using a single display device 640. The input device 637 may be any device capable of driving the display control 635, including, but not limited to, PC computers, laptops, PDAs, and so on. In some embodiments, the input device 637 includes the presentation module 112 and the selection module 114 and/or the application module 232 on the same device as previously described with respect to FIGS. 1A and 2. In some embodiments, the input device 637 may comprise a plurality of devices having the presentation module 112, the selection module 114 and/or the application module 232 on separate devices. In some embodiments, a plurality of input devices, i.e., input devices 102, 103, may be connected to the input device 637, with the input device 637 being a single device, such as a PC computer or laptop that drives the display control 635. In some embodiments, the input device 637 and the display control 635 are on the same device, and in other embodiments the input device 637 and the display control 635 are on different devices. The display control 635 receives instructions from the input device 637 to display content 132 and pseudo-content 134 to audience members using the display device 640. The display device 640 may be any device used to display presentation materials to an audience, such as including, but not limited to, liquid crystal display ("LCD") projectors, overhead projector, video display devices and so on.

FIG. 6B illustrates components of a presentation management system and their connections according to other embodiments. FIG. 6B includes some of the same components as FIG. 6A, except that FIG. 6B includes a second display device 645 controlled by a second display control component 639 and a room control component 615. The display control components 635, 639 are connected to the room control component 615. In some embodiments, the room control component 615 includes the presentation module 112 and the selection module 114 of FIG. 1A. In other embodiments, the display control components 635, 639 contain the presentation module 112 and the selection module 114, and the room control component 615 includes the application manager 232 of FIG. 2. In yet other embodiments, the room control module 615, the presentation module 112, the selection module 114, the application manager 232 or combinations thereof may be located on multiple devices, with the room control device 615 controlling the display devices 640, 645 via the display controls 635, 639.

In some embodiments, the room control module 615 may be configured to receive instructions from various user input devices 102, 103, including, but not limited to, a remote user's computer 660, a presenter's tablet 665, a PDA 670 or a remote control 675. In such embodiments, the room control module 615 may be a conduit for connecting one or more of the user devices 660-675 to the display devices 640, 645 via the display controls 635, 639. In some embodiments, the room control module 615 can also be implemented as a plugin in the display controls 635, 639. Each of the user input devices 660-675 may be physically coupled to the room control module 615 or may be remotely connected in a networked system.

FIG. 6C illustrates an example of components of a networked presentation management system 600 and their connections according to some embodiments. These components are a subset of available components that may be, for example, part of a configuration in a conference room or some other environment where a presentation takes place. The subset of components can include other types of components not shown, as can be appreciated by one skilled in the art. These logical components include services that drive applications to control devices in a room, to perform authentication, perform configurations, and enable individuals, such as a presenter or audience member, access to these controls.

Although all software and hardware components of the system may run on the same computer, typically the components are distributed among several machines, some of which can be co-located, while others can be remote. The software modules according to the embodiments may, thus, be configured to operate on a distributed system. Therefore, the implementation of logical components and services is arbitrary.

Communication among components is mediated by web services calls, although other communications mechanisms such as Remote Procedure Call (RPC) or other custom protocols can also be used. Hardware components can be connected to each other using various methods, such as Video Graphics Array (VGA), Universal Serial Bus (USB), and Ethernet. In the example of FIG. 6C, VGA connections are shown by a solid line. USB connections are shown by a line of small dashes. Ethernet connections are shown by a line of large dashes. The types and combinations of system connections shown in FIG. 6C are for illustrative purposes and are not limited to those shown in the figure. Other types of connections can be used that are not shown in FIG. 6C.

FIG. 6C illustrates one hardware embodiment 600 of the system that includes a room control personal computer (PC) 615, and two controllers, display PC 1 620 and display PC 2 625. In some embodiments, the room control PC 615 manages a database of objects for presentations, rooms, configurations, and devices, and includes presentation data and device configurations for a presentation. The room control PC 615 may store presentation content, such as the slides prepared by a presenter. The room control PC 615 may also store representations of the presentation content such as thumbnail representation of each slide that has been presented or a display list of the presented slides. Alternatively, the presentation content and the representation of the presentation content may be stored on a guest laptop 655 that may have been brought in by the presenter, or on either one of the display PCs 620, 625 and accessed using the room control PC 615 or the laptop 655.

Display PCs 620 and 625 may project the presentation content and/or the representations of the presentation content onto display boards 630, 635. The presentation materials may be projected on to displays 630, 635 through corresponding overhead projectors, projector 1 640 and projector 2 645. It will be appreciated that the presentation content and the representations of the presentation content may be displayed onto separate display boards 630, 635 or on a single display screen (not shown), as previously described. The room control PC 615 may control the projectors 640 and 645 through a service that runs on that machine. Alternatively, display PCs 620 and 625 can control projectors 640 and 645, respectively. The room control PC 615 controls a video switch 650, which in turn controls the routing of displays, including the guest laptop 655 that can be plugged into VGA cables in the room. The video switch can be used to select among several different video sources. The room control PC 615 can also control other functions, such as room lighting, audio, and air conditioning.

The system hardware 600 can be controlled by a presenter through any number of devices in the system 600, including, but not limited to, a guest laptop 655, the presenter's tablet 665, or the room control PC 615. In some embodiments, the presenter is capable of activating the selection module 114 via the room control PC 615 or the guest laptop 655. In some embodiments, audience members may be able to make selections to redisplay presentation content 132 using user input devices 103 such as the remote computer 660, the remote control 675, and the personal digital assistant (PDA) 670 for example, as previously described. In some embodiments, the input devices 102, 103 may be remotely connected to the room control PC 615 via a communication network 610. Similarly, audience members may view presentation content and access representations of the presentation content through such devices 660-675. The audience members may be at a single location, such as in a conference room or meeting hall, or remote from the presenter and be connected by the communication network 610. The video conferencing devices 695 are controlled through the room control PC 615 via a service that runs on that machine. A video switch 650 has an output that mirrors the presentation that is input to it.

A particular meeting may be associated with at least one presenter, and each presenter may be associated with a configuration of the system. For example, in preparation for a presentation, each presenter may set up configurations for the presentation by selecting devices, applications and preferences that will be used, and by specifying which presentation content to display.

Figure 7:
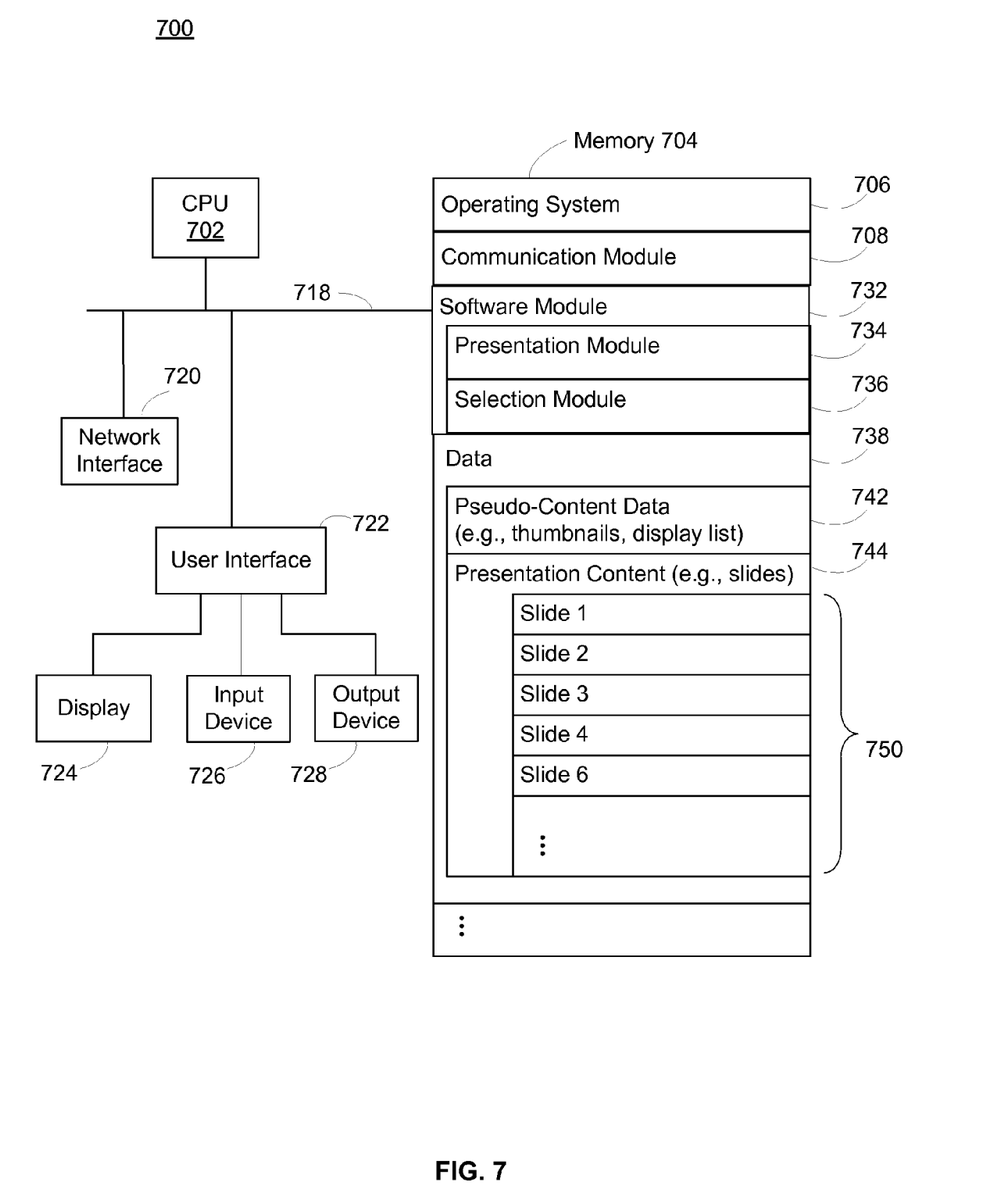
FIG. 7 is a block diagram of a computer system in accordance with some embodiments.

FIG. 7 is a block diagram of a computer system 700 in accordance with some embodiments. The system 700 may be part of a client system or a server system, other generic components of which may be included but are not shown in the interest of brevity. Additionally, the one or more components of the system 700 may be accessed or executed from a single computer or from multiple computer devices. The system 700 generally includes one or more processing units (CPU's) 702, one or more network or other communications interfaces 720, memory 704, and one or more communication buses 718 for interconnecting these components. The communication buses 718 may include circuitry (sometimes called a chipset) that interconnects and controls communications between system components. The system 700 may optionally include a user interface 722, for instance a display 724, input devices 726 and output devices 728. Input devices 726 can include, for example, a keyboard, a mouse, a touchpad display screen, or any other appropriate device that allows a user to enter information into system 700. Output devices 728 can include, for example, a video display unit, a printer, or any other appropriate device capable of providing output data to a user. Note that input devices 726 and output devices 728 can alternatively be a single input/output device. Memory 704 may include high speed random access memory and may also include non-volatile memory, such as one or more magnetic disk storage devices. Memory 704 may include mass storage that is remotely located from the central processing unlit(s) 702. Memory 704, or alternately the non-volatile memory device(s) within memory 704, comprises a computer readable storage medium. Memory 704 stores the following elements, or a subset of these elements, and may also include additional elements:

- an operating system 706 that includes procedures for handling various basic system services and for performing hardware dependent tasks;
- a communications module 708 that is used for connecting the computer system 700 to other servers or computers via one or more communication networks (wired or wireless), such as the Internet, other wide area networks, local area networks, and metropolitan area networks and so on;
- a software module 732 that includes a presentation module 734 and a selection module 736, which as previously described, includes configurations which allow a presenter to enable an audience member to select a particular presentation content for redisplay; and a data component 738 for storing data, including presentation content 744 and content representing pseudo-content 742. The presentation content 744 may include a plurality of slides 750 selected and organized by the presenter to use during a presentation. The pseudo-content 742 may include the display list 122 and thumbnails 126 of FIGS. 1A and 1D. As previously described, as each slide is being presented, a representation of the slide is stored in the data component 738 in the form of, for example, thumbnails or a display list.

Figure 8:
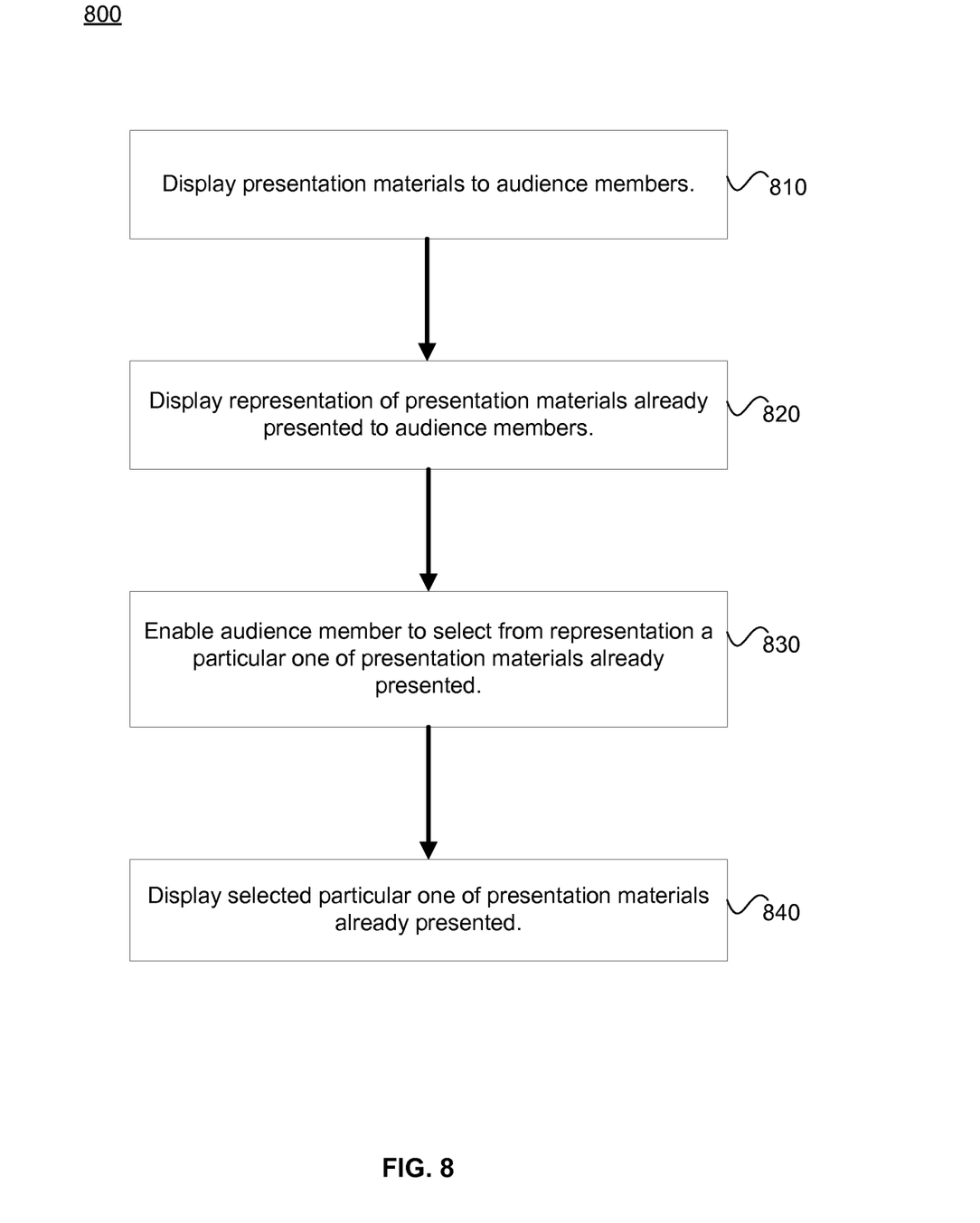
FIG. 8 is a flow diagram illustrating a method for enabling audience members to select from presentation materials in accordance with some embodiments.

FIG. 8 is a flow diagram of a method 800 for enabling audience members to select from presentation materials in accordance with some embodiments. An implementation of the method 800 allows audience members to access content provided by a presenter during a presentation. In some embodiments the method 800 includes a step of presenting materials to audience members (810) and subsequently displaying to audience members a representation of the presentation materials already presented (820). The audience members are then enabled to select from the displayed representation any of the presentation materials already presented (830). In response to the audience selection (830) the particular one of the presentation materials already presented and selected is re-displayed (840).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for accessing content provided by a presenter during a presentation, the system comprising:
one or more processors;
memory; and
one or more software modules stored in the memory and executable by the one or more processors, wherein the one or more software modules include instructions to:
display, on a first display device, presentation materials to audience members in response to presentation instructions issued by a presenter; and
display, on a second display device, a representation of a particular item of the presentation materials that were presented to the audience members in accordance with the presentation instructions issued by the presenter, and
receive, from an input device of an audience member distinct from the presenter, a selection of the representation of the particular item; and
in response to receiving the selection from the input device of the audience member distinct from the presenter, displaying, on the first display device, the particular item.

2. The system of claim 1, wherein the audience members are remote from the presenter and connected by a network.

3. The system of claim 1, wherein:
representations of the presentation materials are displayed on the second display device in a presentation order; and
the presentation order corresponds to an order in which the presentation materials are presented by the presenter to the audience members.

4. The system of claim 1, wherein one or more of the software modules are configured to operate as a distributed system having one or more computers.

5. The system of claim 1, wherein one or more of the software modules include a control module that coordinates different components of a presentation module that is used by the presenter to display presentation materials to audience members on the first display device.

6. The system of claim 1, wherein the first display device is different from the second display device.

7. The system of claim 1, wherein the audience member selects the particular item using a remote control that is operable within the representation of presentation materials.

8. The system of claim 1, wherein a control hand-off from a presentation module that is used by the presenter to display presentation materials to audience members on the first display device to a selection module that is responsive to selections received from the input device of the audience member is automated responsive to one or more aspects of the presentation material, wherein the aspects comprise designated language elements.

9. The system of claim 1, wherein:
the presentation materials comprise slides, and the second display device displays a representation of the presentation materials that comprises thumbnail images of the slides; and
each of the thumbnail images representing a respective presentation material is uploaded to a selection module that is responsive to selections received from the input device of the audience member during or after presentation of the slide by a presentation module that is used by the presenter to display presentation materials to audience members on the first display device.

10. The system of claim 1, wherein the representation of the presentation materials is displayed through a browser on a webpage.

11. A computer implemented method for accessing content provided by a presenter during a presentation, the method comprising:
displaying, on a first display device, presentation materials to audience members in response to presentation instructions issued by a presenter;
displaying, on a second display device, a representation of a particular item of the presentation materials that were presented to the audience members in accordance with the presentation instructions issued by the presenter; and
receiving, from an input device of an audience member distinct from the presenter, a selection of the representation of the particular item; and
in response to receiving the selection from the input device of the audience member distinct from the presenter, displaying, on the first display device, the particular item.

12. The method of claim 11, wherein the representation of the particular item of the presentation materials is displayed as an overlay on the first display device.

13. The method of claim 11, wherein displaying the representation of the particular item of the presentation materials comprises displaying the representation of the particular item of the presentation materials at locations remote from the presenter.

14. The method of claim 11, wherein:
representations of the presentation materials are displayed on the second display device in a presentation order; and
the presentation order corresponds to an order in which the presentation materials are presented by the presenter to the audience members.

15. The method of claim 11, further comprising enabling the presenter to control an operation of enabling the audience member to select from a representation of the presentation materials already presented.

16. The method of claim 15, wherein enabling the audience member to select from the representation of the presentation materials comprises enabling the audience member to use a remote control to select the representation of the particular item.

17. The method of claim 15, further comprising automating the control of enabling the audience member to select from the representation of the presentation materials already presented responsive to one or more aspects of the presentation material, wherein the aspects comprise designated language elements.

18. The method of claim 11, wherein displaying a representation of the particular item comprises displaying the representation of the particular item through a browser on a webpage.

19. A non-transitory computer readable storage medium, storing one or more programs for execution by one or more processors, the one or more programs comprising instructions for:
- displaying, on a first display device, presentation materials to audience members in response to presentation instructions issued by a presenter;
- displaying, on a second display device, a representation of a particular item of the presentation materials that were presented to the audience members in accordance with the presentation instructions issued by the presenter; and
- receiving, from an input device of an audience member distinct from the presenter, a selection of the representation of the particular item; and
- in response to receiving the selection from the input device of the audience member distinct from the presenter, displaying, on the first display device, the particular item.

20. The non-transitory computer readable storage medium of claim 19, wherein the representation of the particular item of the presentation materials is displayed as an overlay on the first display device.

21. The non-transitory computer readable storage medium of claim 19, wherein the first display device is different from the second display device.

22. The non-transitory computer readable storage medium of claim 19, wherein instructions for displaying the representation the particular item of the presentation materials comprises instructions for displaying the representation of the particular item in a web browser on a personal device.

23. The non-transitory computer readable storage medium of claim 19, wherein:
- representations of the presentation materials are displayed on the second display device in a presentation order; and
- the presentation order corresponds to an order in which the presentation materials are presented by the presenter to the audience members.

24. The non-transitory computer readable storage medium of claim 19, further comprising instructions for enabling the presenter to control an operation of enabling the audience member to select from a representation of the presentation materials already presented.

25. The non-transitory computer readable storage medium of claim 19, further comprising instructions for automating the control of enabling the audience member to select from the representation of the presentation materials already presented responsive to one or more aspects of the presentation material, wherein the aspects comprise designated language elements.

* * * * *